United States Patent Office 3,520,854
Patented July 21, 1970

---

3,520,854
METHOD OF TREATING LIQUID DITHIOLS AND LIQUID DITHIOLS-RUBBER BLENDS WITH ALKANOLAMINES AND METHYL AMINO-ALKYL PHENOLS AND COMPOSITIONS THEREOF
Paul F. Warner, Phillips, Tex., assignor to Phillips Petroleum Company, a corporation of Delaware
No Drawing. Filed Sept. 12, 1966, Ser. No. 578,517
Int. Cl. C08c 11/54; C08f 27/06
U.S. Cl. 260—79
10 Claims

ABSTRACT OF THE DISCLOSURE

A liquid dithiol is converted to a polysulfide polymer which is curable by a novel catalytic curing agent comprising (1) a alkanolamine, and
(2) a methylaminoalkyl phenol, to yield a polymeric composition which is useful as a sealant, e.g., putty, calking compounds and the like.

---

This invention relates broadly to polysulfide polymeric compositions useful as sealants e.g., putty, calking compounds, and the like. In accordance with one aspect, this invention relates to a novel catalytic curing agent for the polysulfide polymeric compositions. In accordance with another aspect, this invention relates to a method of preparing polysulfide polymeric compositions useful as sealants.

Putty compositions or sealants which can be converted to rubbery, oil resistant solids under mild conditions of cure are of interest where products are desired which have joints or seams therein, which, of necessity, must be water-tight, gas-tight, or resistant to hydrocarbon solvents. A particularly important application for sealants is found in the aircraft industry where efficient calking of aluminum seams is required in the fabrication of fuel cells or bunkers. Such sealants are used along the seams joining the aluminum sheet stocks and in the holes where rivets are to be placed. Sealants used in such applications must be flexible over a wide temperature range, resistant to hydrocarbon solvents and capable of being easily applied. Sealants desirably should be strongly adherent to glass or metal. Such sealants can also be used for the glass-to-metal seal in the windows of aircraft. Similarly, sealants or calking compounds are used in the building industry to seal around door and window frames. Also, such sealants are useful for binding solid propellants in rocket motors.

In U.S. 3,219,638, 3,234,188 and 3,251,811, there are disclosed and claimed polymeric mercaptans and process for their preparation. In carrying out the curing for these mercaptans, a sulfur donor is used. The curing reaction can be illustrated as follows:

(1) $2RSH + 2S \rightarrow RSSSR + H_2S$ (2) $H_2S + ZnO \rightarrow ZnS + H_2O$ Amines are generally used to catalyze the reaction. Slow cure amines such as alkanolamines provide a slow cure without visible liberation of $H_2S$. However this slow cure yields a soft gummy polymer. More active amines such as dimethylaminomethyl phenol and tri(dimethylaminomethyl)phenol provide more rapid cures but because of the rapid liberation of $H_2S$, produce a porous polymer. For most applications of these polymers as sealants, the porous structure of the product is undesirable.

I have now discovered that a rapid cure can be obtained without the undesirable porous nature of the polymers usually obtained with an active catalyst by using a combination of an active catalyst such as dimethylaminomethyl phenol and tri(dimethylaminomethyl) phenol in combination with an alkanolamine slow cure catalyst such as monoethanolamine.

By various aspects of this invention, one or more of the following, or other, objects can be obtained.

It is an object of this invention to provide a method for curing a liquid dimercaptan or dithiol to a rubbery product utilizable as a calking compound, a putty composition, a fuel tank sealing compound, a rocket fuel binder, shoe soles, etc.

It is a further object of this invention to provide a putty or sealant composition from an actively cured low molecular weight dimercaptan without forming a porous product.

A still further object of this invention is to eliminate the porous structure of a rapidly cured polythiol-rubber blend.

Other aspects, objects, and the several advantages of this invention are apparent to one skilled in the art from a study of this disclosure and the appended claims.

According to the invention, there is provided a curable composition comprising a low molecular weight liquid dithiol, having incorporated therein a sulfur yielding curing agent, a basic $H_2S$ acceptor and a catalytic promoter comprising (1) a slow cure alkanol amine compound such as monoethanolamine and (2) an active amine catalyst such as dimethylaminomethyl phenol and tri(dimethylaminomethyl)phenol.

Whereas I do not wish to be limited to any particular theory of operation, it appears that the active amine catalyst catalyzes reaction 1 and the slow cure catalyst accelerates reaction 2 to such an extent that no free $H_2S$ is liberated to cause foaming during the cure.

The low molecular weight liquid dithiols used in the invention are preferably liquid cyclic dimercaptans having up to and including 20 carbon atoms per molecule.

Generally, the curable compositions to which the invention is applicable are those disclosed and claimed in U.S. 3,219,638; 3,251,811; and 3,234,188. Preferably, the invention is especially suited for those compositions disclosed and claimed in application Ser. No. 176,801, filed Mar. 1, 1962, now U.S. 3,274,142.

Compositions to which the invention is preferably applicable are those compositions which are prepared by blending a liquid dimercaptan compound with a moderate amount of rubber and then incorporating sulfur in an amount sufficient to effect cure of the blend when the mixture is subjected to mild curing conditions. More specifically, the blend consists of about 95 to 60 weight parts of a liquid dithiol which has the general formula HS—R—SH wherein R is an organic radical containing from 1 to 20 carbon atoms, and about 5 to 40 weight parts of a non-halogenated rubbery polymer selected from the group consisting of homopolymers of conjugated dienes, and copolymers of conjugated dienes with monomers having ethylenic linkage copolymerizable therewith.

The liquid dithiols that can be employed according to the invention can being represented by the formula HS—R—SH wherein R is an organic radical containing up to and including 20 carbon atoms per molecule. The hydrocarbon dimercaptans and especially the cyclic hydrocarbon dimercaptans as exemplified by 2,9 p-methane dithiol are preferred. In the above formula, R can be a hydrocarbon radical such as aliphatic, cycloaliphatic, aryl and the like or a heterocyclic structure such as:

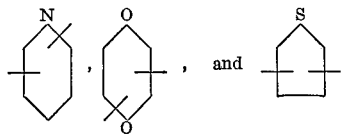

as well as other organic radicals.

Representative examples of suitable dimercaptan compounds that can be employed according to the invention include dimercapto ethane, dimercapto propane, 1,5-dimercapto pentane, 1,6-dimercapto hexane, 1,8-dimercapto decane, 2,3-dimercapto pentadecane, 1, 6 - dimercapto eicosane, 1,4 - dimercapto - 2 - butene, 1,8 - dimercapto-2 - octene, dimercapto ethyl ether, dimercapto propylether, dimercapto dipropyl sulfide, dimercapto xylene, dimercapto diethoxy benzene, 1,3 - dimercapto toluene, p-dimercapto benzene, dimercapto cyclohexane, dimercapto methylcyclohexane, 2,9 - p - methane dithiol, dimercapto alphaterpinene, dimercapto phennandrene, dimercapto sylvestrene, 2,5 - dimercapto pyridine, dimercapto thiophene, dimercapto p-dioxane, ethylcyclohexyl dimercaptan, and the like.

The dithiols which are utilized in the blends of the invention can be produced by any of the known processes which yield these materials. Cyclic dimercaptans can be prepared conveniently, for example, by reacting a cyclic terpene with $H_2S$ in the presence of ultraviolet light.

The vulcanizing or curing agents that can be incorporated into the compositions of the invention include free sulfur and sulfur-donor or sulfur yielding compounds. Suitable sulfur-donor or sulfur-yielding compounds that can be used include thiuram polysulfides having the structural formula

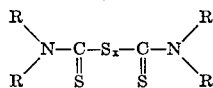

in which $x$ is 2, 3, or 4, R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

Selenium dithiocarbamates of the formula

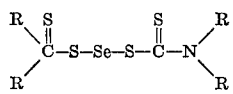

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds. Examples of such compounds are selenium dimethyl dithiocarbamate, selenium diethyl dithiocarbamate, selenium didecyldithiocarbamate, selenium dioctyldithiocarbamate, selenium dinonyldithiocarbamate, selenium dicyclohexyl dithiocarbamate, selenium pentamethylenedithiocarbamate, and the like.

Other sulfur-donor compounds that can be used include N,N'-polythiodiamines of the formula

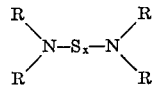

where $x$ is 2, 3, or 4, and R represents an alkyl or cycloalkyl group containing up to and including 10 carbon atoms, such radicals being purely hydrocarbon or substituted by cyano groups. The R groups can be joined to form heterocyclic structures which include the nitrogen atom, such heterocyclic structures being joined by juncture of alkyl groups or inclusive of oxygen, sulfur or nitrogen. Examples of such compounds are N,N'-dithiobis(diethylamine),
N,N'-dithiobis-(dibutylamine),
N,N'-trithiobis(dihexylamine),
N,N'-thiobis,(dioctylamine),
N,N'-dithiobis(didecylamine),
N,N'-dithiobis(morpholine),
N,N'-dithiobis(thiamorpholine),
N,N'-dithiobis(piperdine),
N,N'-dithiobis(piperazine),
N,N'-dithiobis-(n-butylaminoacetonitrile)
N,N'-dithiobis-(beta-ethylaminopropionitrile),
N,N'-tetrathiobis(octyl-6-cyanooctylamine),
N,N'-dithiobis(dicyclohexylamine),
N,N'-dithiobis(decyl-5-cyanoamylamine),
N,N'-trithiobis(hexyl-9-cyanononylamine),
N,N'-dithiobis(n-butylaminopropionitrile),
and the like.

Another class of compounds suitable for the purposes of the present invention are the thiazyl sulfides, including mercaptobenzothiazole, zinc 2 - mercaptobenzothiazole, cupric 2-mercaptobenzothiazole, benzothiazyl disulfide, and the like.

An additoinal class of compounds suitable for the purpose of the invention as a sulfur donor include the disulfides of the general formula R—$S_x$—R in which $x$ is 2, 3, or 4 and R is an alkyl or cycloalkyl group containing from 1 to 16 carbon atoms. Typical examples of such compounds are dimethyl disulfide, diethyl disulfide, di-n-propyl disulfide, diisopropyl disulfide, diamyl disulfide, dicyclohexyl disulfide, dioctyl disulfide, didecyl disulfide, ditetradecyl disulfide dihexadecyl trisulfide and the like.

The amount of sulfur curing agent employed in the curing of the compositions according to the invention can vary appreciably but is usually in the range from 5 to 50 parts by weight per 100 parts by weight of dithiol with 10 to 30 parts by weight being preferred. The amount of sulfur added will depend upon the consistency desired for the final product. For example, larger amounts of sulfur result in tough, leathery products whereas the lower amounts result in sealants. The curing temperature employed will generally be about room temperature but higher temperatures can be used as desired. By using the catalyst of the invention, a rapid cure can be obtained at room temperature.

As above mentioned, during the curing operation $H_2S$ is liberated and it is desirable to add a basic material which will combine with the $H_2S$ and prevent foaming during the curing operation. Suitable $H_2S$ acceptors that can be employed include the oxides of zinc, cobalt and lead. Zinc oxide, however, is preferred. The amount of such additive incorporated in the blend will vary appreciably depending on the amount of sulfur added, the rate of cure, the degree of cure, the amount of $H_2S$ liberated, and the like. However, in general, the amounts of these materials added is generally a stoichiometric amount and will ordinarily range from about 5 to 50, preferably from about 10 to 30, parts by weight per 100 parts by weight of dithiol.

Other additives such as fillers, e.g., carbon black, silica, titanium dioxide, zinc sulfide, calcium silicate, hydrated alumina, calcium carbonate, and the like, antioxidants, softeners, vulcanization activators, vulcanization accelerator-activators, and other additives and preservatives known in the rubber art can be present in the blend.

The slow cure catalyst used according to the invention is generally an alkanolamine catalyst. A preferred slow cure catalyst is monethanolamine. Examples of other alkanolamine catalysts which are useful as slow cure catalysts according to the invention are diethyanolamine, triethanolamine, di-n-butanolamine, and the like. The amount of slow cure catalyst will vary from 0.5 to 40 weight parts per 100 parts of curable composition, preferably 1 to 20 weight parts per 100 parts of curable composition.

The active amine catalysts useful in the invention are generally methyl amino alkyl phenols. Suitable active amines useful as catalysts according to the invention include dimethylaminomethyl phenol, tri(dimethylaminomethyl)phenol, and the like. The amount of active amine catalysts will vary from about 0.1 to 20 parts of catalyst per 100 parts of curable composition, preferably 0.2 part of catalyst per 100 parts of curable composition.

The total amount of catalyst used will vary over a large range depending on the rate of cure desired. Generally, the amount of total catalyst will be in the range of about 1 to about 40 weight parts of catalyst per 100 parts of curable composition, preferably in the range of about 2 to about 20 weight parts of catalyst per 100 parts of curable composition. The ratio of the slow cure catalyst to the active amine catalyst will vary but generally will be in the range of about 10:1 to 1:1, preferably 5:1 to 2:1.

The invention can be further exemplified by the following specific examples.

EXAMPLE I 10 grams of 2,9-p-menthanedithiol-cis 1,4-polybutadiene was blended with 2.4 g. sulfur flowers and 3.1 g. ZnO (stoichiometric+10% excess). The dithiol contained 20 weight percent of cis 1,4-polybutadiene, having a mercaptan sulfur content of 22.0 weight percent. To this mixture was added 0.124 g. of dimethylaminomethyl phenol. The mixure started to foam up immediately and this continued for several hours. The cured polymer had good rubbery properties, but was full of holes.

EXAMPLE II

The above recipe and procedure were repeated except that only 0.031 g. of dimethylaminomethyl phenol was added. Again the mixture foamed up slowly during the cure. The cure was incomplete, giving a polymer which was still tacky after several days.

EXAMPLE III

The recipe and procedure of Example I were repeated except that 1 g. of dibutylphthalate was added as a plasticizer and 0.27 g. monoethanolamine was used as the catalyst in place of dimethylaminomethyl phenol. The mixture did not foam and was dry to touch in 1 hour. However, the cured polymer was soft and gummy even after 48 hours at 120° F.

EXAMPLE IV

The recipe and procedure of Example I were repeated except that 0.278 g. monoethanolamine and 0.062 g. dimethylaminomethyl phenol was used in place of the 0.124 g. of dimethylaminomethyl phenol and 2.0 g. of dibutylphthalate was added as plasticizer. The mixture did not foam up. The cured properties were excellent. The sample had excellent adhesion to the metal dish in which it was placed.

EXAMPLE V 100 g. of the 2,9-p-methanediol-cis 1,4-polybutadiene mixture specified in Example I, 31 g. ZnO, and 24 g. sulfur flowers were ground in a mortar; 2.78 g. monoethanolamine and 0.619 g. dimethylaminomethyl phenol were added and mixed in thoroughly. The mixture did not foam up and the cure was so rapid that difficulty was experienced in getting it transferred to a glass plate mold. The properties of the cured polymer were similar to those of the product of Example IV.

EXAMPLE VI

The recipe and procedure of Example V were repeated except that the mixture was ground in a chilled mortar to slow down the cure rate while mixing. The properties of the cured polymer were similar to those of the products of Examples IV and V.

The cured products from Examples V and VI have excellent rubbery properties as illustrated below in Table I and also have exceptional adherence to glass surfaces. Great difficulty was experienced in removing the cured products obtained in Examples V and VI from the glass mold in spite of the fact that the mold was liberally coated with Dow-Corning mold release emulsion 35B.

TABLE I

|  | Example | |
|---|---|---|
|  | V | VI |
| Tensile strength,[1] p.s.i | 23 | 134 |
| Elongation, percent | [2] 400 | [2] 400 |
| Shore D hardness | 35 | 28 |

[1] ASTM D412-51T 20 in./min.
[2] Sample did not break.

The compositions according to the invention find great utility in calks and sealants. The original cost of the low molecular weight dithiols is low and the amount of inert builders which can be used with the low molecular weight dithiols is relatively large. The low molecular weight dithiols are mobile liquids at normal temperatures and more builder can be added without increasing the viscosity of the mixture beyond the point at which the mixture can be applied with a gun.

Reasonable variations and modifications are possible within the scope of the foregoing disclosure, and the appended claims to the invention without departing from the spirit thereof.

What is claimed is:

1. A composition of matter comprising a low molecular weight liquid dithiol having incorporated therein a sulfur curing agent, a basic $H_2S$ acceptor, and a catalyst comprising (a) an alkanolamine compound and (b) a methylaminoalkyl phenol, wherein the ratio of (a) to (b) is 10:1 to 1:1.

2. A composition of matter according to claim 1 wherein said liquid dithiol is a liquid cyclic dimercaptan having up to and including 20 carbon atoms per molecule.

3. A composition of matter according to claim 2 wherein said liquid dithiol has incorporated therein about 5 to 40 weight parts of a non-halogenated rubbery polymer selected from the group consisting of homopolymers of conjugated dienes, and copolymers of conjugated dienes with monomers having an ethylenic linkage copolymerizable therewith.

4. A composition of matter according to claim 1 wherein the amount of catalyst used is in the range of 1 to 40 weight parts per 100 weight parts of the dithiol.

5. A composition of matter according to claim 1 wherein (a) is monoethanolamine.

6. A composition of matter according to claim 1 wherein (b) is dimethylaminomethyl phenol.

7. A composition of matter according to claim 1 wherein (b) is tri(dimethylaminomethyl)phenol.

8. A method for preparing a curable composition from a liquid dithiol comprising blending with said liquid dithiol a sulfur curing agent, a $H_2S$ acceptor and a minor amount of a catalyst consisting of an alkanolamine compound and a methylaminoalkyl phenol, the sulfur curing agent and the $H_2S$ acceptor each being blended in an amount in the range from about 5 to 50 parts by weight per 100 parts by weight of dithiol and wherein the ratio of the alkanolamine compound to the methylaminoalkyl phenol is 10:1 to 1:1.

9. A method according to claim 8 wherein said liquid dithiol has incorporated therein about 5 to 40 weight parts of a non-halogenated rubbery polymer selected from the group consisting of homopolymers of conjugated dienes and copolymers of conjugated dienes with monomers having an ethylenic linkage copolymerizable therewith, said dithiol being present in about 95 to 60 weight parts.

10. A method according to claim 8 wherein said catalyst consists of monoethanolamine and dimethylaminomethyl phenol.

References Cited

UNITED STATES PATENTS

| | | | |
|---|---|---|---|
| 2,484,621 | 10/1949 | Hardman | 260—79.5 |
| 3,219,638 | 11/1965 | Warner | 260—79 |

OTHER REFERENCES

Hofmann, W., Vulcanization, Palmerton (1965), New York, p. 175.

JOSEPH L. SCHOFER, Primary Examiner

C. A. HENDERSON, JR., Assistant Examiner

U.S. Cl. X.R.

36—32; 260—5, 41.5, 79.5, 79.7, 785, 793, 798